UNITED STATES PATENT OFFICE.

JAMES GRANT HILL, OF LINDSAY, CALIFORNIA.

COMPOSITION OF MATTER FOR DESTROYING GERMS OR INSECTS.

1,141,961. Specification of Letters Patent. Patented June 8, 1915.

No Drawing. Application filed May 14, 1914. Serial No. 838,597.

*To all whom it may concern:*

Be it known that I, JAMES GRANT HILL, a citizen of the United States, residing at Lindsay, in the county of Tulare and State of California, have invented certain new and useful Improvements in Compositions of Matter for Destroying Germs or Insects, of which the following is a specification.

My invention relates to a composition of matter to be used as a germicide and insecticide, and has particular reference to an improved spray or wash for trees, or fruit trees, such as citrus fruits or citrus fruit trees, for destroying scale, flies, bugs, worms or the like and the eggs thereof found thereon.

My invention is founded upon the discovery that nicotin sulfate possesses particular and marked advantages as a germicide and insecticide, not heretofore known as far as I am aware. This substance is very active in destroying the germs and insects, without injury to the trees or the like.

My composition of matter comprises nicotin sulfate, preferably having forty per cent. of nicotin; a detergent or soap, preferably "Gold Dust washing powder"; and water.

In the preparation of the composition, I mix one pound of nicotin sulfate with twenty-five pounds of soap, preferably "Gold Dust washing powder" and this mixture is then placed into one hundred gallons of water, the same being thoroughly stirred so that the ingredients go into solution as much as possible. It is obvious that my composition of matter may be placed upon the market without being dissolved in water, such water being added in proper amounts by the user.

The final product, which is a liquid, forms a spray or wash, for destroying the germs, insects or the like attacking the trees. This spray or wash may be applied to the trees by any well known or preferred method.

It is to be understood that the form of the invention herewith shown and described is to be taken as a preferred example of the same, and that various changes in the proportions of the ingredients may be resorted to without departing from the spirit of the invention or the scope of the subjoined claims.

Having described my invention, what I claim is:—

1. A composition of matter for destroying germs, insects and the eggs thereof, comprising nicotin sulfate, a saponaceous material, and water.

2. A composition of matter for destroying germs, insects and the eggs thereof, comprising approximately one pound of nicotin sulfate, twenty-five pounds of soap, and one hundred gallons water.

In testimony whereof I affix my signature in presence of two witnesses.

JAMES GRANT HILL.

Witnesses:
W. I. HODGE,
T. T. OSTRANDER.